US012033277B2

(12) United States Patent
Luo et al.

(10) Patent No.: US 12,033,277 B2
(45) Date of Patent: Jul. 9, 2024

(54) NORMALIZED THREE-DIMENSIONAL AVATAR SYNTHESIS AND PERCEPTUAL REFINEMENT

(71) Applicant: Pinscreen, Inc., Los Angeles, CA (US)

(72) Inventors: Huiwen Luo, Los Angeles, CA (US); Koki Nagano, Los Angeles, CA (US); Zejian Wang, Los Angeles, CA (US); Lingyu Wei, Los Angeles, CA (US); Liwen Hu, Los Angeles, CA (US); Hao Li, Los Angeles, CA (US)

(73) Assignee: PINSCREEN, INC., Los Angeles, CA (US)

( * ) Notice: Subject to any disclaimer, the term of this patent is extended or adjusted under 35 U.S.C. 154(b) by 68 days.

(21) Appl. No.: 17/573,159

(22) Filed: Jan. 11, 2022

(65) Prior Publication Data

US 2022/0222892 A1 Jul. 14, 2022

Related U.S. Application Data

(60) Provisional application No. 63/136,070, filed on Jan. 11, 2021.

(51) Int. Cl.
*G06T 17/00* (2006.01)
*G06N 3/045* (2023.01)
*G06T 15/50* (2011.01)
*G06V 40/16* (2022.01)

(52) U.S. Cl.
CPC ............ *G06T 17/00* (2013.01); *G06N 3/045* (2023.01); *G06T 15/506* (2013.01); *G06V 40/168* (2022.01)

(58) Field of Classification Search
CPC .................................. G06T 17/00; G06T 7/50
See application file for complete search history.

(56) References Cited

U.S. PATENT DOCUMENTS

| 2021/0012558 A1* | 1/2021 | Li | G06T 17/00 |
| 2021/0295020 A1* | 9/2021 | Cao | G06V 10/764 |
| 2023/0077187 A1* | 3/2023 | Zafeiriou | G06T 3/4046 |

OTHER PUBLICATIONS

Booth, James, et al. "A 3d morphable model learnt from 10,000 faces." Proceedings of the IEEE conference on computer vision and pattern recognition. 2016. (Year: 2016).*

(Continued)

*Primary Examiner* — Ryan McCulley
(74) *Attorney, Agent, or Firm* — SoCal IP Law Group LLP; Jonathan Pearce

(57) ABSTRACT

A system, method, and apparatus for generating a normalized three-dimensional model of a human face from a single unconstrained two-dimensional image of the human face. The system includes a processor that executes instructions including receiving the single unconstrained two-dimensional image of the human face, using an inference network to determine an inferred normalized three-dimensional model of the human face based on the single unconstrained two-dimensional image of the human face, and using a refinement network to iteratively determine the normalized three-dimensional model of the human face with a neutral expression and unshaded albedo textures under diffuse lighting conditions based on the inferred normalized three-dimensional model of the human face.

21 Claims, 7 Drawing Sheets

(5 of 7 Drawing Sheet(s) Filed in Color)

(56) References Cited

OTHER PUBLICATIONS

Gecer, Baris, et al. "Ganfit: Generative adversarial network fitting for high fidelity 3d face reconstruction." Proceedings of the IEEE/CVF conference on computer vision and pattern recognition. 2019. (Year: 2019).*

* cited by examiner

NORMALIZED THREE-DIMENSIONAL AVATAR SYNTHESIS AND PERCEPTUAL REFINEMENT

RELATED APPLICATION INFORMATION

This patent claims priority from U.S. provisional patent application No. 63/136,070, entitled NORMALIZED 3D AVATAR SYNTHESIS AND PERCEPTUAL REFINEMENT, filed Jan. 11, 2021, the entire contents of which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the generating a normalized three-dimensional model of a human face from an unconstrained two-dimensional image of the human face.

Description of the Related Art

All kinds of facial expressions can be seen in selfies, portraits, and Internet pictures. These photos are taken from various camera types, and under a vast range of angles and lighting conditions. A picture of a person's frontal face with blank expressions, captured in an evenly lit environment, and free from perspective distortion, is not only ideal for facial recognition, but also extremely useful for a wide range of graphics applications, ranging from portrait manipulation to image-based three-dimensional (3D) avatar digitization or generation. While billions of portraits and selfies are shared over the Internet, people tend to smile and express their emotions in front of a camera. Pictures are mostly taken under a vast range of challenging lighting conditions, and selfies generally cause noticeable facial distortions, for example, enlarged noses when used for 3D avatar generation.

The creation of high-fidelity virtual avatars has mostly been undertaken by professional production studios for applications such as film and game production, due to the complex process of digitizing a person, which typically involves sophisticated equipment and controlled capture environments. However, automated three-dimensional face digitization methods that are based on unconstrained images such as selfies or downloaded internet pictures are gaining popularity for a wide range of consumer applications, such as immersive telepresence, video games, or social media apps based on personalized avatars.

While many single-view avatar digitization solutions exist, the most recent methods are based on non-linear three-dimensional morphable face models (3DMM) generated from generative adversarial networks (GANs), which outperform traditional linear models that often lack details and likeness of the original subject. However, to successfully train these networks, hundreds of thousands of subjects in various lighting conditions, poses, and expressions are needed. While highly detailed three-dimensional face models can be recovered from still images, the generated textures often inadvertently integrate the lighting of the environment. As a result, there is no easy way to create or obtain unshaded albedo textures. In addition, human facial expressions present in these images are difficult to neutralize making these methods unsuitable for applications that involve relighting or animating the face of the character. In particular, inconsistent textured models are obtained when images are taken under different lighting conditions. Collecting the necessary volume of three-dimensional face data with neutral expressions and controlled lighting conditions or such models with corresponding 2D input images is challenging. As a result, existing methods for creating avatars lack of the training and ground truth data containing normalized three-dimensional faces necessary to produce high-quality normalized three-dimensional avatars.

There exist various methods for dealing with these issues and constraints, some of which have been created by the inventors named herein. However, a more robust solution for digitizing a high-quality normalized three-dimensional avatar of a person from a single unconstrained photograph without requiring massive face data continues to be desirable.

DESCRIPTION OF THE DRAWINGS

The patent or application file contains at least one drawing executed in color. Copies of this patent or patent application publication with color drawing(s) will be provided by the Office upon request and payment of the necessary fee.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The systems and methods herein use a deep learning framework to generate a normalized three-dimensional model of a human face from an unconstrained two-dimensional image of the human face using a two-stage approach. First, a highly robust normalized three-dimensional face generator with a non-linear morphable face model embedded into a generative adversarial network (GAN), e.g., StyleGAN2, provides for generation of an inferred detailed normalized three-dimensional model of a human face from an unconstrained two-dimensional image. This inference stage is then followed by an iterative perceptual refinement stage that uses the inferred model as regularization to mitigate limited available training samples of normalized faces. A normalized face dataset, which consists of a combination photogrammetry scans, carefully selected photographs, and generated fake people with neutral expressions in diffuse lighting conditions, is used for training the GAN. Though the dataset contains two orders of magnitude fewer subjects than other GAN-based three-dimensional facial reconstruction methods, high-quality normalized three-dimensional models can be produced from challenging unconstrained input images, demonstrating superior performance to the current state-of-the-art.

More specifically, the GAN-based facial digitization framework can generate a high-quality textured three-dimensional face models with neutral expression and normalized lighting using only thousands of real-world subjects. Once the first stage uses the non-linear morphable face model embedded into the GAN to robustly generate detailed and clean assets of a normalized face, the likeness of the person is then transferred from the input image in a perceptual refinement stage based on iterative optimization using a differentiable renderer. GAN-inversion, using an inversion step to convert the input image to a latent vector, can be used to learn facial geometry and texture jointly. To enable construction of a three-dimensional neutral face inference from the input image, the image is connected with an embedding space of a non-linear three-dimensional morphable face model (3DMM) using an identity regression network (e.g., based on identity features from FaceNet). The normalized face dataset is used to train the GAN to be sufficiently effective. The robustness of the framework can be demonstrated on a wide range of extremely challenging input examples.

Description of Apparatus

Figure 1:
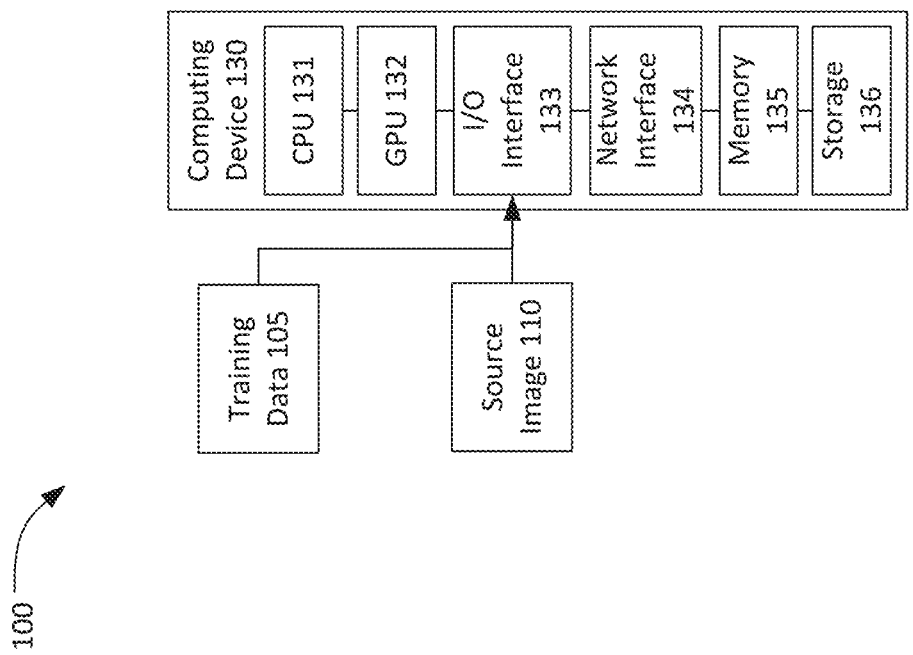
FIG. 1 is a structural diagram of a system for generating a normalized three-dimensional model of a human face from an unconstrained two-dimensional image of the human face.

FIG. 1 is a structural diagram of a system 100 for generating a normalized three-dimensional model of a human face from an unconstrained two-dimensional image of the human face. The system 100 includes training data 105, an image source 110, and a computing device 130. The image source 110 may be storage (e.g., storage 136) on the computing device 130 itself or may be external. The various components may be interconnected by a network.

The training data 105 can include a set of images of faces for training one or more facial reconstruction networks. The training data can include high-fidelity three-dimensional scans, photographs and corresponding monocular three-dimensional face reconstructions, and GAN-generated faces of fake subjects. The training data 105 enables the generative portion of the GAN to "learn" about facial geometry, texture, illumination and expression neutralization to create possible options. The training data 105 also allows the discriminator portion of the generative adversarial network to work with the generative portion to "knock out" or exclude faces that are inadequate or otherwise do not make the grade. If the training is good, over time, the GANs becomes better at producing textures, evening lighting, and neutralizing geometries, and the discriminator becomes more "fooled" by the real or fake determination for the resulting face and indicates that the face is realistic.

The source image 110 may come from a still camera or a video camera capturing an unconstrained image of a face. The source image 110 may be from a short term or long-term storage device holding data that represents images. For example, the source image 110 may come from a database of images, may be the Internet, or may be any number of other sources of image data. Associated image data is not an image generated using any complex lighting or capture system, or any high-resolution depth sensors such that any actual facial data is contained within the image data itself. Instead, the image is a typical, two-dimensional image format such as PNG, JPG, BMP, and may be in almost any resolution, so long as a face is recognizable as human.

The computing device 130 includes a central processing unit (CPU) 131, a graphics processing unit (GPU) 132, an input-output (I/O) interface 133, a network interface 134, memory 135, and storage 136.

The CPU 131 may execute instructions associated with an operating system for the computing device 130 as well as instructions associated with one or more applications suitable for enabling the functions described herein. The CPU 131 may be or include one or more microprocessors, microcontrollers, digital signal processors, application specific integrated circuits (ASICs), or systems-on-a-chip (SOCs). The CPU 131 may be specialized, designed for operations upon visual, graphical, or audio data, or may be general purpose processors. Though identified as a central processing unit, the CPU 131 may be multiple processors, for example, multi-core processors or a series of processors joined by a bus to increase the overall throughput or capabilities of the CPU 131.

The GPU 132 may execute instructions suitable for enabling the functions described herein. In particular, the GPU 132 may be used in connection with particular image-related operations which the GPU 132 is uniquely suited to perform. The GPU 132 may be any of the things that the CPU 131 is. However, the GPU 132 is distinct in that it is a specialized processor that is designed for the purpose of processing visual data and performs faster memory operations and access. More recently, GPUs, like GPU 132, have also been manufactured with instruction sets designed around artificial intelligence or neural network functions. The instruction sets and memory in the GPU 132 are specifically designed for operation upon graphical data or upon training data sets (which in this case involve graphical data) and in efficiently operating as neural networks. In this way, the GPU 132 may be especially suited to operation upon the image data or to quickly and efficiently performing the complex mathematical operations described herein. Like the CPU 131, the GPU 132 is shown as a single graphics processing unit, but may be one or more graphics processing units in a so-called multi-core format, or linked by a bus or other connection that may together be applied to a single set of or to multiple processing operations. There also now exist specialized processors for use with artificial intelligence. They perform many of the same functions typically performed by GPU 132 or may replace the GPU 132 in some cases. These specialized processors may include additional instruction sets or may be specially designed for integration with the networks described herein.

The I/O interface 133 may include one or more general purpose wired interfaces (e.g., a universal serial bus (USB), high-definition multimedia interface (HDMI)), one or more connectors for storage devices such as hard disk drives, flash drives, or proprietary storage solutions.

The network interface 134 may include radio-frequency circuits, analog circuits, digital circuits, one or more antennas, and other hardware, firmware, and software necessary for network communications with external devices. The network interface 134 may include both wired and wireless connections. For example, the network may include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol.

The network interface 134 may include one or more specialized processors to perform functions such as coding/decoding, compression/decompression, and encryption/decryption as necessary for communicating with external devices using selected communications protocols. The network interface 134 may rely on the CPU 131 to perform some or all of these functions in whole or in part.

The memory 135 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 135 may store software programs and routines for execution by the CPU 131 or GPU 132 (or both together). These stored software programs may include operating system software. The operating system may include functions to support the I/O interface 133 or the network interface 134, such as protocol stacks, coding/decoding, compression/decompression, and encryption/decryption. The stored software programs may include an application or "app" to cause the computing device to perform portions or all of the processes and functions described herein. The words "memory" and "storage", as used herein, explicitly exclude transitory media including propagating waveforms and transitory signals.

Storage 136 may be or include non-volatile memory such as hard disk drives, flash memory devices designed for long-term storage, writable media, and other proprietary storage media, such as media designed for long-term storage of image data.

In some cases, one or more additional computing devices, like computing device 130, may be connected by the network interface 134 which may be a wired interface, such as Ethernet, universal serial bus (USB), or a wireless interface such as 802.11x, LTE, or other wireless protocol to enable the additional, computing devices to perform some or all of the operations discussed herein. For example, the CPU 131 and GPU 132 of the computing device 130 may be less powerful than that available in a connected system (e.g., a multicore process or group of multicore processors) or a group of GPUs (e.g., a single powerful GPU or a set of GPUs interconnected by SLI or CrossFire®) such that a connected computing device is better-capable of performing processor-intensive tasks such as the convolution or segmentation processes discussed more fully below. In some implementations, the one or more additional computing devices may be used to perform more processor-intensive tasks, with the tasks being offloaded via the I/O interface 133 or network interface 134. In particular, the training processes discussed herein may rely upon external computing devices.

Figure 2:
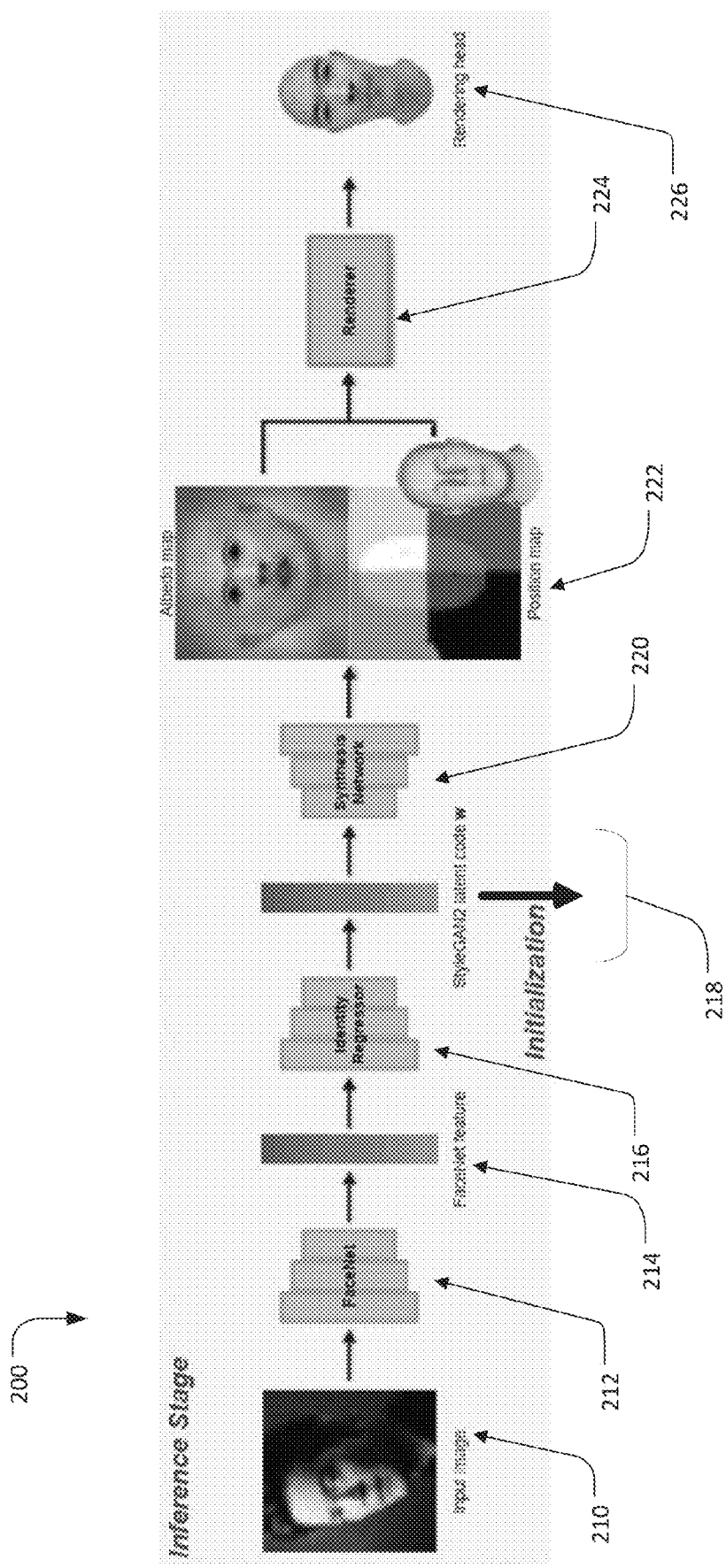
FIG. 2 is a functional diagram of an inference stage of a deep learning framework system used for generating a normalized three-dimensional model of a human face from an unconstrained two-dimensional image of the human face.

FIG. 2 is a functional diagram of an inference network 200 of an inference stage of a deep learning framework system used for generating a normalized three-dimensional model of a human face from an unconstrained two-dimensional image of the human face, which could be implemented with the system 100 of FIG. 1. This is the first step in the process.

An input image 210, such as an unconstrained two-dimensional image of the human face, is received by the system. The system uses a pre-trained face recognition network 212, e.g., FaceNet, to extract a person-specific facial embedding identity feature 214 given the unconstrained input image 210. This identity feature 214 is then mapped to a latent code 218 (e.g., latent vector w∈W+) in a latent space of synthesis network G 220 using an identity regressor network R 216. The synthesis network G 220 decodes w to an expression neutral face geometry and a normalized albedo texture 222, which can then be rendered by a renderer 224 to determine a rendering head 226. Specifically, the synthesis network G 220 generates geometry and texture in UV space, where each pixel in the UV map represents RGB albedo color and a three-dimensional position of a corresponding vertex using a 6-channel tuple (r, g, b, x, y, z).

The synthesis network G 220 is first trained using a GAN to ensure robust and high-quality mapping from any normal distributed latent vector Z~N ($\mu$, $\sigma$). Then, the identity regression network R 216 is trained by freezing synthesis network G 220 to ensure accurate mapping from the identity feature 214 from the input image 210.

Figure 4:
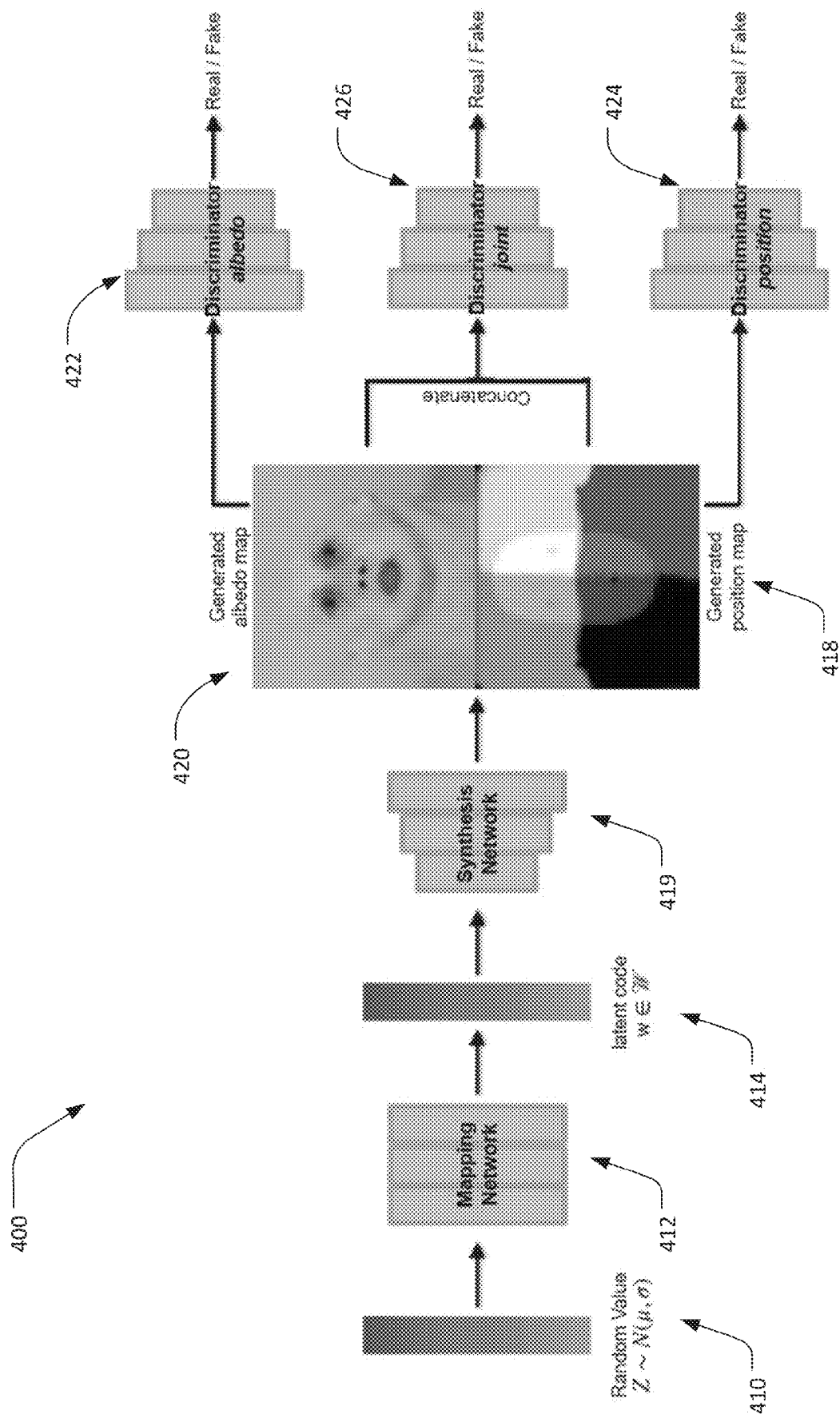
FIG. 4 is a functional diagram of generative adversarial network (GAN) based geometry and texture synthesis.

The synthesis network G 220 is trained to embed a nonlinear 3DMM into its latent space, in order to model a cross correlation between three-dimensional neutral face geometry and neutral albedo texture, as well as to generate high-fidelity and diverse three-dimensional neutral faces from a latent vector Turning briefly to FIG. 4, a network 400 (e.g. a GAN such as StyleGAN2) is trained as shown. This process may be used to train a morphable face model using three-dimensional geometry and albedo texture.

To enable joint learning between geometry and texture, the random value Z~N ($\mu$, $\sigma$) 410 of the classical linear 3DMM S∈$R^{3 \times N}$, which consists of a set of N=13557 vertices on the face surface, is projected onto a UV space using a cylindrical parameterization to project onto mapping network 412. The resulting latent code 414 is then rasterized by a synthesis network 419 to generate an albedo map 420 and a three-channel position map 418 with a 256×256 pixel resolution. Three discriminators, including an albedo discriminator 422, a position (or vertex) discriminator 424, and a joint discriminator 426, are jointly trained taking maps as input. For example, the albedo discriminator 422 can take albedo maps, the position discriminator 424 can take position maps, and the joint discriminator 426 can take both albedo and position maps. The albedo and position discriminators 422 and 424 ensure the quality and sharpness of each generated map, while the joint discriminator 426 can learn and preserve their correlated distribution. This GAN is trained from the provided ground truth three-dimensional geometries and albedo textures without any knowledge of the identity features.

In short, there are two intermediate networks, mapping network 412 that maps a random value 410 to latent code 414 in latent space, and synthesis network 419 that takes latent code 414 as input and generates an albedo map and a position map. The synthesis network is trained to place the resulting three-dimensional model into a three-dimensional space so that it can be used for generating albedo maps and for generating neutral faces. Thereafter, three discriminators are used, one for the evenly lit albedo map, one for the neutral facial map, and one for the combination of the two, to determine whether the results are real or fake compared to the real training dataset.

Figure 5:
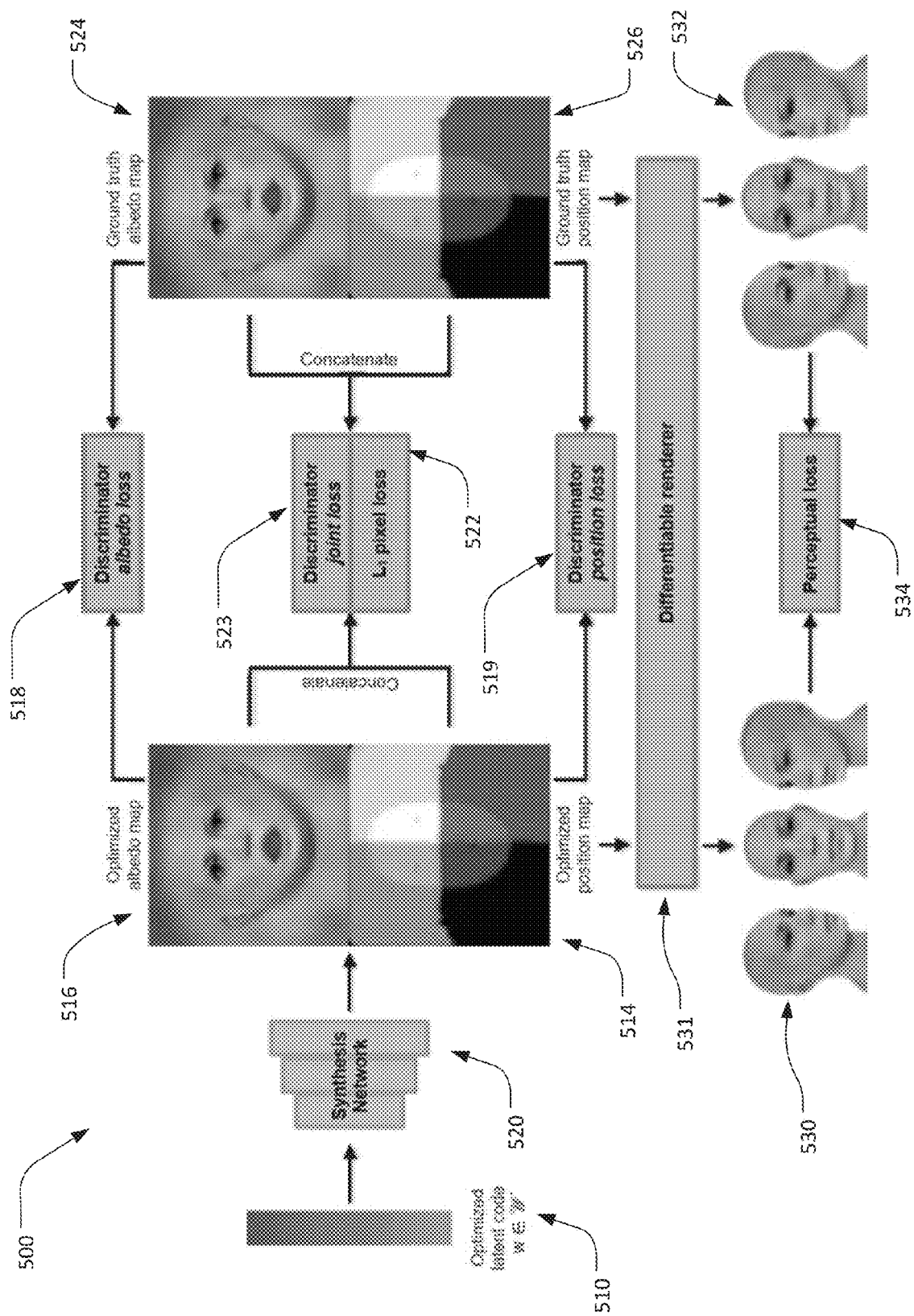
FIG. 5 is a functional diagram of GAN inversion to reconstruct geometry and texture.

Turning to FIG. 5, after obtaining G, the trained GAN network, the corresponding input latent code 510 is retrieved via a GAN inversion algorithm and used in the synthesis network 520. In an example, the disentangled and extended latent space W+:=$R^{14 \times 512}$ of StyleGAN2 was chosen as the inversion space to achieve better reconstruction accuracy. As shown in FIG. 5, an optimization approach was used to find the embedding of a target pair of position map 524 and albedo map 526 in an effort to make optimized albedo map 516 and optimized position map 514 match as closely as possible with the ground truth maps. The following loss function is used:

$$L_{inv} = L_{pix} + \lambda_1 L_{LPIPS} + \lambda_2 L_{adv} \quad (1)$$

where $L_{pix}$ is the $L_1$ pixel loss 522 of the synthesized position map and texture map, $L_{LPIPS}$ is the LPIPS distance as a perceptual loss 534, and $L_{adv}$ is the adversarial loss favoring realistic reconstruction results using the three discriminators trained with G. Note that while LPIPS outperforms other perceptual metrics in practice, it is trained with real images and measuring the perceptual loss directly on UV maps would lead to unstable results. The adversarial loss of the albedo map can be found at 518 and the adversarial loss of the position map can be found at 519 through direct comparison, but this data is only part of the story. Therefore, a differentiable renderer 531 is used to render the geometry and texture maps from three fixed camera viewpoints 530, 532 and compute the overall perceptual loss 534 (or perceptual difference) based on these renderings. Finally, the identity regressor network R can be trained using the solved latent codes of the synthesis network G and corresponding identity feature from the input image 210.

While datasets exist for frontal human face images in neutral expression, the amount of such data is still limited and the lighting conditions often vary between datasets. Instead of manually collecting more images from the Internet to expand training data, an automatic approach was used to produce frontal neutral portraits based on the pre-trained StyleGAN2 network trained with Flicker Faces HQ (FFHQ) dataset. A vector α in the intermediate latent space W+(e.g., where W+=$R^{18 \times 512}$ was trained to frontalize arbitrary head poses, and another vector β was trained to neutralize any expressions. Each sample is first randomly drawn from Z~N(μ, σ), mapped to the intermediate latent vector w via the pre-trained mapping network, and then aggregated with the two vectors α, β to get w'=w+α+β before being fed into StyleGAN2 for face normalization. Thus, all images in the normalized face dataset are frontal and have neutral expressions. Also, these images have well-conditioned diffuse scene illuminations, which are preferred for conventional gradient descent-based three-dimensional face reconstruction methods.

In one example, images were collected from the internet as input and an identity feature α was predicted from each image. β is a latent editing code to neutralize expression and w_mean is a fixed value in latent space, which could generate a mean and frontalized face. Then, these three vectors, α, β, and w_mean, are aggregated together to get w'=α+β+w_mean before being fed into StyleGAN2 for face normalization.

For each synthesized image, light normalization and three-dimensional face fitting were applied based on Face2Face (i.e., an approach for real-time facial re-enactment of a monocular target image) to generate a three-dimensional face geometry and then project the light normalized image for the albedo texture. Instead of using the linear 3DMM completely, which results in coarse and smooth geometry, an inference pipeline is run to generate three-dimensional geometry for use as the initialization for Face2Face optimization. After optimization, the resulting geometry is non-linear geometry predicted from the inference pipeline plus a linear combination of blendshape basis optimized by Face2Face, thus preserving its non-linear expressiveness. The frontal poses of the input images facilitate direct projections onto UV space to reconstruct high-fidelity texture maps.

Training data can include high-fidelity three-dimensional scans, photographs and corresponding monocular three-dimensional face reconstructions, and GAN-generated faces of fake subjects. In an example of a training procedure, a high-quality scan dataset of images of 431 subjects with accurate photogrammetry scans, 63 subjects from 3D Scan Store, and 368 subjects from Triplegangers is collected. Synthesis network $G_0$ is then trained from the scan dataset, and is then temporarily frozen for latent code inversion and the training of identity regressor $R_0$. These bootstrapping networks ($R_0$, $G_0$) trained on the small scan dataset are applied onto the normalized face dataset to infer geometry and texture, which are then optimized and/or corrected by the Face2Face algorithm. Next, the improved geometry and texture are added back into the training of ($R_0$, $G_0$) to obtain the fine-tuned networks ($R_1$, $G_1$) with improved accuracy and robustness.

In an example, a normalized face dataset consists of 5601 subjects, with 368 subjects from Triplegangers, 597 from Chicago Face Dataset (CFD), 230 from the Compound Facial Expressions (CFE) dataset, 153 from the CMU Multi-PIE Face Dataset, 67 from the Radboud Faces Database (RaFD), and the remaining 4186 synthetically are generated.

Figure 3:
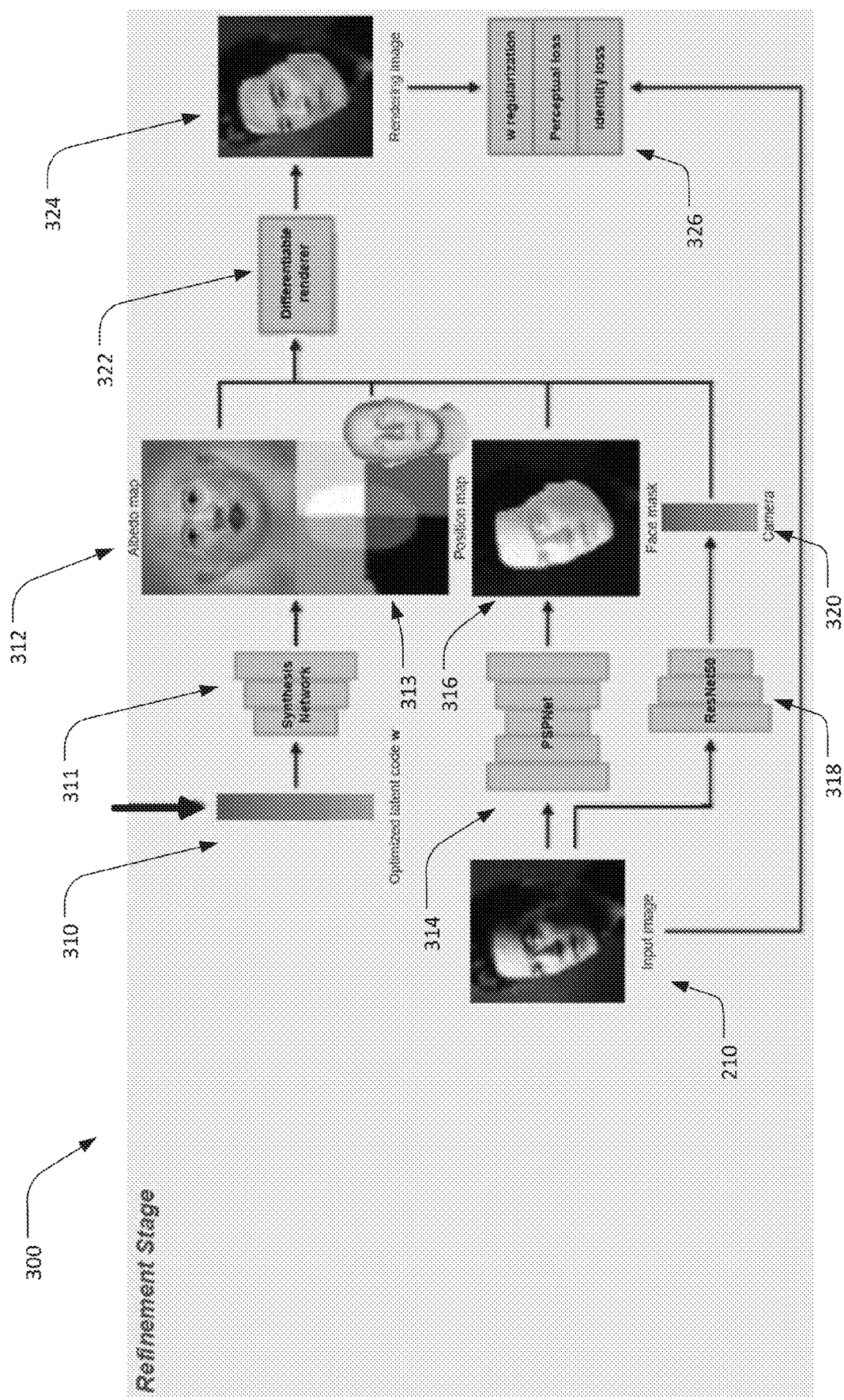
FIG. 3 is a functional diagram of a refinement stage of a deep learning framework system used for generating a normalized three-dimensional model of a human face from an unconstrained two-dimensional image of the human face.

FIG. 3 is a functional diagram of a refinement network 300 of a refinement stage of a deep learning framework system used for generating a normalized three-dimensional model of a human face from an unconstrained two-dimensional image of the human face, which could be implemented with the system 100 of FIG. 1. This is the second step of this process.

While the inference stage described with respect to FIG. 2 trained with training data as described above can reliably infer the normalized texture and geometry from an unconstrained two-dimensional input image, a second refinement stage with perceptual refinement can help determine a neighbor of the predicted latent code in the embedding space that matches the input image better. While the pre-trained face recognition network 212 predicts the most likely latent code, the variance could be large. A small perturbation of the latent code may not affect the identity feature training, but a small error in the identity code may cause greater inconsistency in the inference stage after passing identity regressor network R and synthesis network G. An "end-to-end" refinement step is thus introduced to ensure the consistency between the final renderings using the predicted geometry and texture, and the input image.

For the refinement stage, the latent vector w 310 produced at the inference stage 200 is optimized iteratively using a differentiable renderer 322 by minimizing the perceptual difference between the input image 210 and the rendered image 324 via gradient descent. The differentiable renderer 322 is reused to generate a two-dimensional face rendered image Î 324 from the estimated three-dimensional face (i.e., albedo map 312 and position map 313 created by synthesis network 311 based on latent vector w 310), and compute the perceptual distance with the input image I 210. To project the three-dimensional face back to the head pose in input image I 210, a regression network 318 is trained with a convolutional neural network 50 layers deep (e.g., ResNet50) to estimate the camera $c=[t_x, t_y, t_z, r_x, r_y, r_z, f]^T$ from I 210, where $[t_x, t_y, t_z]^T$ and $[r_x, r_y, r_z]^T$ denote the camera translation and rotation, and f is the focal length. The regression network 318 is trained using camera data 320 including the accurate camera data from the scan dataset and the estimated camera data from the normalized face dataset computed by Face2Face. To blend the projected face only image with the background from the original image I 210, a Pyramid Scene Parsing Network (PSPNet) 314 is trained with a convolutional neural network that is 101 layers deep (e.g., ResNet101) using CelebAMask-HQ. The rendered pose image Î 316 is then blended into the segmented face region from input image I 210. The perceptual loss 326 is again measured by LPIPS distance.

The final loss is simply represented as:

$$L_{refine} = L_w + \lambda_1 L_{LPIPS} + \lambda_2 L_{id} \quad (2)$$

where $L_w$ is a regularization term on w, i.e., the $L_1$ distance (or Euclidean distance) between the variable w and its initial prediction derived by R, enforcing the similarity between the modified latent and the initial prediction. $L_{id}$ is the $L_1$ loss (or cosine similarity) between the identity feature of Î and I, to preserve consistent identity.

Figure 6:
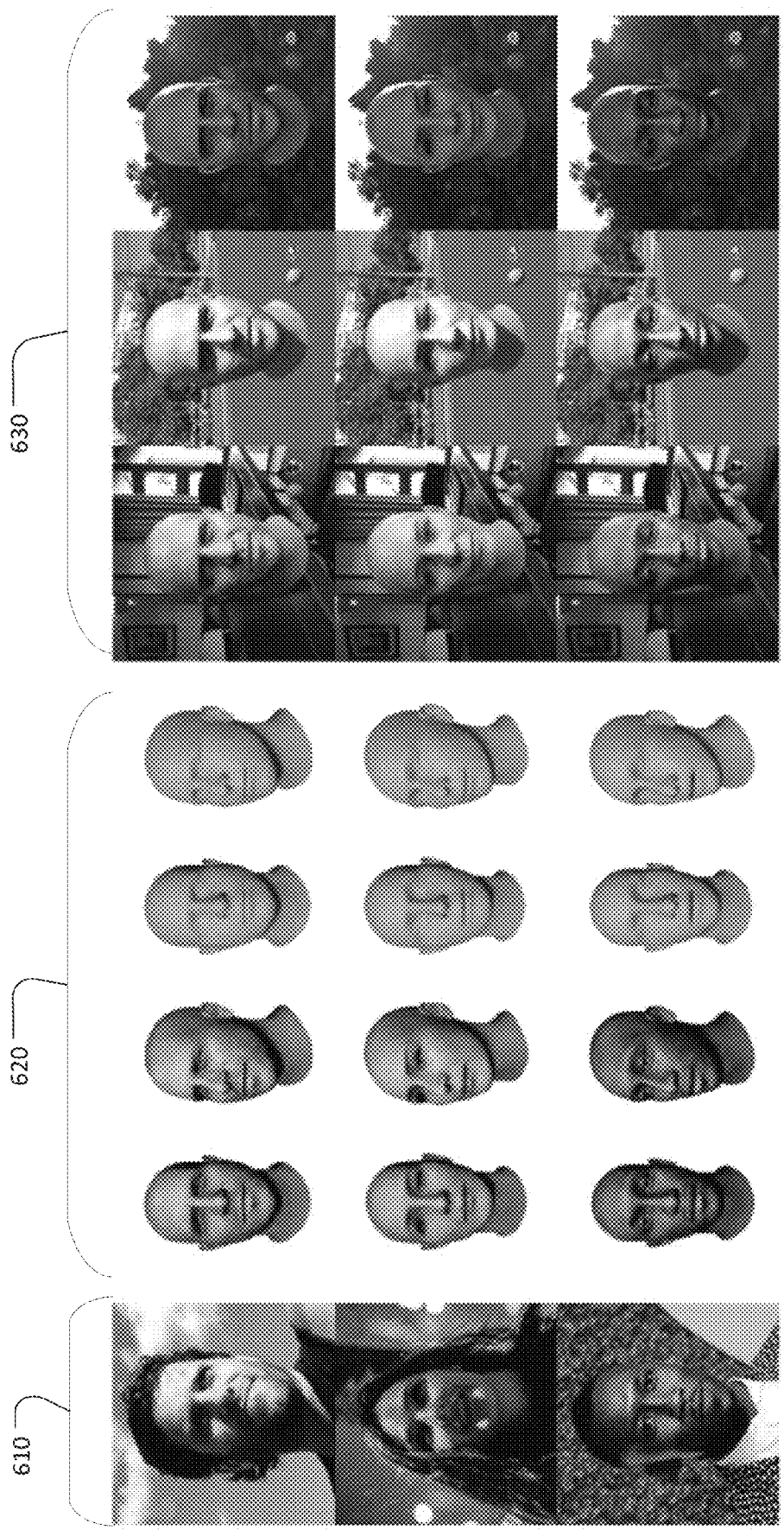
FIG. 6 is a set of examples of construction of high-quality textured three-dimensional faces with neutral expressions and normalized lighting conditions from a single unconstrained photograph.

FIG. 6 is a set of examples of construction of high-quality textured three-dimensional faces with neutral expressions and normalized lighting conditions from a single unconstrained two-dimensional input image. Images 610 are unconstrained two-dimensional input images. Images 620 are reconstructions of the input images by the methods described here. Images 630 are depictions of renderings of the reconstructions on different backgrounds under different lighting conditions. As shown in FIG. 6, the method described herein can handle extremely challenging unconstrained photographs with very harsh illuminations, extreme filtering, and arbitrary expressions. Plausible textured face models can be produced where the likeness of the input subject is preserved and visibly recognizable.

Description of Processes

Figure 7:
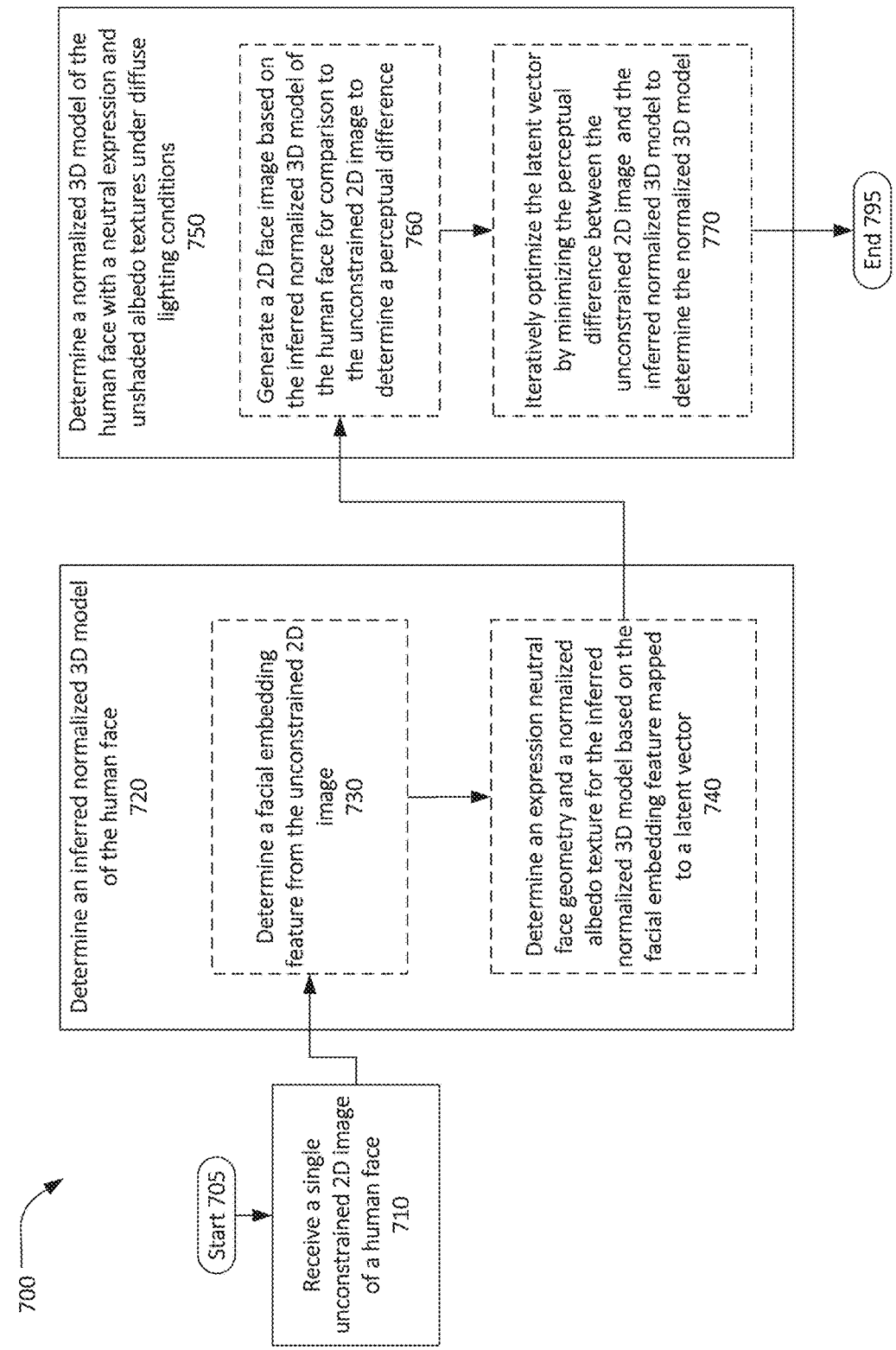
FIG. 7 is a flowchart of a process for generating a normalized three-dimensional model of a human face from an unconstrained two-dimensional image of the human face.

FIG. 7 is a flowchart of a process 700 for generating a normalized three-dimensional model of a human face from an unconstrained two-dimensional image of the human face using the system described above with respect to FIGS. 2-5. The process begins at start 705 and continues until end 795. The process is shown as a single iteration, but may take place many times, even many times in rapid succession. Steps shown in dashed boxes are optional. For example, multiple images may be fed into the system in rapid succession or multiple iterations of a part of the process may take place. The process of FIG. 7 assumes that the GANs have already been trained.

After the start 705, the process begins with receipt of a single unconstrained tw0-dimensional image of an unconstrained face at 710. This image may come from a still camera, a frame of video, or some other source. The image may have been type with various types of cameras at various angles and under unknown lighting conditions. Some portions of the face may be occluded due to the angle at which the image was taken, or hair or other objects covering portions of the face.

The unconstrained image is an image from which a neutralized face will be generated. As indicated above, generating a normalized three-dimensional model of a human face from an unconstrained two-dimensional image of the human face may preferably take place on a computer, like computing device 130, that is better suited to the operation of neural networks and to complex graphical renderings and mathematical calculations. As a result, the majority or all of the process described with respect to FIG. 7 may take place on such a computing device.

At step 720, an inference network determines an inferred normalized three-dimensional model of the human face based on the single unconstrained two-dimensional image of the human face. Step 720 can include step 730 and/or step 740.

At step 730, the inference network uses a pre-trained face recognition network to determine a facial embedding feature from the single unconstrained two-dimensional image of the human face.

At step 740, the inference network uses a synthesis network to determine an expression neutral face geometry and a normalized albedo texture for the inferred normalized three-dimensional model of the human face based on the facial embedding feature mapped to a latent vector.

At step 750, a refinement network iteratively determines the normalized three-dimensional model of the human face with a neutral expression and unshaded albedo textures under diffuse lighting conditions based on the inferred normalized three-dimensional model of the human face. Step 750 can include steps 760 and/or 770.

At step 760, a differential renderer generates a two-dimensional face image based on the inferred normalized three-dimensional model of the human face for comparison to the single unconstrained two-dimensional image of the human face to determine a perceptual difference. The differential renderer may generate the two-dimensional face image based on the inferred normalized three-dimensional model of the human face based on camera translation, camera rotation, and focal length of the single unconstrained two-dimensional image of the human face determined by a regression network.

At step 770, the refinement network iteratively optimizes the latent vector by minimizing the perceptual difference between the single unconstrained two-dimensional image of the human face and the inferred normalized three-dimensional model of the human face to determine the normalized three-dimensional model of the human face with a neutral expression and unshaded albedo textures. The normalized three-dimensional model of the human face can include a position map and an albedo map.

The process then ends at 795.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A deep learning-based framework system for generating a normalized three-dimensional model of a human face from an unconstrained two-dimensional image of the human face, the system comprising a processor and memory, the processor executing instructions which cause the processor to:
   receive the single unconstrained two-dimensional image of the human face;
   use an inference network to determine an inferred normalized three-dimensional model of the human face based on the single unconstrained two-dimensional image of the human face; and
   use a refinement network to iteratively determine the normalized three-dimensional model of the human face with a neutral expression and unshaded albedo textures under diffuse lighting conditions based on the inferred normalized three-dimensional model of the human face,
   wherein the refinement network iteratively optimizes the latent vector by minimizing a perceptual difference between the single unconstrained two-dimensional image of the human face and the inferred normalized three-dimensional model of the human face to determine the normalized three-dimensional model of the human face with a neutral expression and unshaded albedo textures using a loss function that includes:

$$L_{inv} = L_{pix} + \lambda_1 L_{LPIPS} + \lambda_2 L_{adv}$$

where $L_{pix}$ is an L1 pixel loss of a synthesized position map and texture map, $L_{LPIPS}$ is a $L_{PIPS}$ distance as a perceptual loss, and $L_{adv}$ is an adversarial loss favoring realistic reconstruction results using three trained discriminators comprising a first discriminator for an evenly lit albedo map, a second discriminator for a neutral facial map, and a third discriminator for the combination of the evenly lit albedo map and the neutral facial map, and wherein the three discriminators are used to determine whether the minimizing a perceptual difference is real or fake compared to a real training dataset.

2. The system of claim 1, wherein the inference network:
   uses a pre-trained face recognition network to determine a facial embedding identity feature from the single unconstrained two-dimensional image of the human face; and
   uses a synthesis network to determine an expression neutral face geometry and a normalized albedo texture for the inferred normalized three-dimensional model of the human face based on the facial embedding identity feature mapped to a latent vector.

3. The system of claim 2, wherein the synthesis network is initially trained using a generative adversarial network based on a scan dataset of photometry scans and subsequently trained by the generative adversarial network based on a normalized face dataset of photometry scans and synthetic data.

4. The system of claim 2, wherein a differential renderer generates a two-dimensional face image based on the inferred normalized three-dimensional model of the human face for comparison to the single unconstrained two-dimensional image of the human face to determine a perceptual difference.

5. The system of claim 4, wherein the differential renderer generates the two-dimensional face image based on the inferred normalized three-dimensional model of the human face based on camera translation, camera rotation, and focal length of the single unconstrained two-dimensional image of the human face determined by a regression network.

6. The system of claim 5, wherein the refinement network iteratively optimizes the latent vector by minimizing the perceptual difference between the single unconstrained two-dimensional image of the human face and the two-dimensional face image to determine the normalized three-dimensional model of the human face with a neutral expression and unshaded albedo textures using the loss function.

7. The system of claim 1, wherein the normalized three-dimensional model of the human face comprises a position map and an albedo map.

8. A method of generating a normalized three-dimensional model of a human face from an unconstrained two-dimensional image of the human face, the method comprising:
   receiving the single unconstrained two-dimensional image of the human face;
   using an inference network to determine an inferred normalized three-dimensional model of the human face based on the single unconstrained two-dimensional image of the human face; and
   using a refinement network to iteratively determine the normalized three-dimensional model of the human face with a neutral expression and unshaded albedo textures under diffuse lighting conditions based on the inferred normalized three-dimensional model of the human face,
   wherein the refinement network iteratively optimizes the latent vector by minimizing a perceptual difference between the single unconstrained two-dimensional image of the human face and the inferred normalized three-dimensional model of the human face to determine the normalized three-dimensional model of the human face with a neutral expression and unshaded albedo textures using a loss function that includes:

$$L_{inv} = L_{pix} + \lambda_1 L_{LPIPS} + \lambda_2 L_{adv}$$

where $L_{pix}$ is an L1 pixel loss of a synthesized position map and texture map, $L_{LPIPS}$ is a $L_{PIPS}$ distance as a perceptual loss, and $L_{adv}$ is an adversarial loss favoring realistic reconstruction results using three trained discriminators comprising a first discriminator for an evenly lit albedo map, a second discriminator for a neutral facial map, and a third discriminator for the combination of the evenly lit albedo map and the neutral facial map, and wherein the three discriminators are used to determine whether the minimizing a perceptual difference is real or fake compared to a real training dataset.

9. The method of claim 8, wherein the inference network:
uses a pre-trained face recognition network to determine a facial embedding identity feature from the single unconstrained two-dimensional image of the human face; and
uses a synthesis network to determine an expression neutral face geometry and a normalized albedo texture for the inferred normalized three-dimensional model of the human face based on the facial embedding identity feature mapped to a latent vector.

10. The method of claim 9, wherein the synthesis network is initially trained using a generative adversarial network based on a scan dataset of photometry scans and subsequently trained by the generative adversarial network based on a normalized face dataset of photometry scans and synthetic data.

11. The method of claim 9, wherein a differential renderer generates a two-dimensional face image based on the inferred normalized three-dimensional model of the human face for comparison to the single unconstrained two-dimensional image of the human face to determine a perceptual difference.

12. The method of claim 11, wherein the differential renderer generates the two-dimensional face image based on the inferred normalized three-dimensional model of the human face based on camera translation, camera rotation, and focal length of the single unconstrained two-dimensional image of the human face determined by a regression network.

13. The method of claim 12, wherein the refinement network iteratively optimizes the latent vector by minimizing the perceptual difference between the single unconstrained two-dimensional image of the human face and the two-dimensional face image to determine the normalized three-dimensional model of the human face with a neutral expression and unshaded albedo textures using the loss function.

14. The method of claim 8, wherein the normalized three-dimensional model of the human face comprises a position map and an albedo map.

15. An apparatus comprising a storage medium storing a program having instructions which when executed by a processor will cause the processor to:
receive a single unconstrained two-dimensional image of a human face;
use an inference network to determine an inferred normalized three-dimensional model of the human face based on the single unconstrained two-dimensional image of the human face; and
use a refinement network to iteratively determine a normalized three-dimensional model of the human face with a neutral expression and unshaded albedo textures under diffuse lighting conditions based on the inferred normalized three-dimensional model of the human face,
wherein the refinement network iteratively optimizes the latent vector by minimizing a perceptual difference between the single unconstrained two-dimensional image of the human face and the inferred normalized three-dimensional model of the human face to determine the normalized three-dimensional model of the human face with a neutral expression and unshaded albedo textures using a loss function that includes:

$$L_{inv} = L_{pix} + \lambda_1 L_{LPIPS} + \lambda_2 L_{adv}$$

where $L_{pix}$ is an L1 pixel loss of a synthesized position map and texture map, $L_{LPIPS}$ is a $L_{PIPS}$ distance as a perceptual loss, and $L_{adv}$ is an adversarial loss favoring realistic reconstruction results using three trained discriminators comprising a first discriminator for an evenly lit albedo map, a second discriminator for a neutral facial map, and a third discriminator for the combination of the evenly lit albedo map and the neutral facial map, and wherein the three discriminators are used to determine whether the minimizing a perceptual difference is real or fake compared to a real training dataset.

16. The apparatus of claim 15, wherein the inference network:
uses a pre-trained face recognition network to determine a facial embedding identity feature from the single unconstrained two-dimensional image of the human face; and
uses a synthesis network to determine an expression neutral face geometry and a normalized albedo texture for the inferred normalized three-dimensional model of the human face based on the facial embedding identity feature mapped to a latent vector.

17. The apparatus of claim 16, wherein the synthesis network is initially trained using a generative adversarial network based on a scan dataset of photometry scans and subsequently trained by the generative adversarial network based on a normalized face dataset of photometry scans and synthetic data.

18. The apparatus of claim 16, wherein a differential renderer generates a two-dimensional face image based on the inferred normalized three-dimensional model of the human face for comparison to the single unconstrained two-dimensional image of the human face to determine a perceptual difference.

19. The apparatus of claim 18, wherein the differential renderer generates the two-dimensional face image based on the inferred normalized three-dimensional model of the human face based on camera translation, camera rotation, and focal length of the single unconstrained two-dimensional image of the human face determined by a regression network.

20. The apparatus of claim 19, wherein the refinement network iteratively optimizes the latent vector by minimizing the perceptual difference between the single unconstrained two-dimensional image of the human face and the two-dimensional face image to determine the normalized three-dimensional model of the human face with a neutral expression and unshaded albedo textures using the loss function.

21. The apparatus of claim 15, wherein the normalized three-dimensional model of the human face comprises a position map and an albedo map.

* * * * *